(12) United States Patent
Fukushima

(10) Patent No.: US 12,544,392 B2
(45) Date of Patent: Feb. 10, 2026

(54) TREATMENT OF ADENOVIRUS INFECTION OR DISEASE ASSOCIATED WITH ADENOVIRUS INFECTION

(71) Applicant: SymBio Pharmaceuticals Limited, Tokyo (JP)

(72) Inventor: Koji Fukushima, Tokyo (JP)

(73) Assignee: SymBio Pharmaceuticals Limited, Tokyo (JP)

( * ) Notice: Subject to any disclaimer, the term of this patent is extended or adjusted under 35 U.S.C. 154(b) by 0 days.

(21) Appl. No.: 18/980,262

(22) Filed: Dec. 13, 2024

(65) Prior Publication Data

US 2025/0161336 A1    May 22, 2025

Related U.S. Application Data

(63) Continuation of application No. 18/656,519, filed on May 6, 2024.

(30) Foreign Application Priority Data

Aug. 7, 2023   (JP) .................................. 2023-128607

(51) Int. Cl.
*A61K 31/675*     (2006.01)
*A61P 31/20*      (2006.01)

(52) U.S. Cl.
CPC ............ *A61K 31/675* (2013.01); *A61P 31/20* (2018.01)

(58) Field of Classification Search
CPC .... A61K 31/675; A61K 47/18; A61K 47/183; A61K 47/26; A61K 9/0019; A61K 9/08;
(Continued)

(56) References Cited

U.S. PATENT DOCUMENTS

2011/0263536 A1    10/2011   Lanier et al.
2013/0072458 A1    3/2013    Painter et al.
(Continued)

FOREIGN PATENT DOCUMENTS

JP    2013-509433 A    3/2013
JP    2013-522302 A    6/2013
(Continued)

OTHER PUBLICATIONS

"A Phase 2a Study of IV BCV in Subjects With Adenovirus Infection (ATHENA)," ClinicalTrials.gov, <https://clinicaltrials.gov/study/NCT04706923?cond=brincidofovir&page=2&rank=18&tab=history&a=8>, dated Apr. 7, 2023 (12 pages).
(Continued)

*Primary Examiner* — Savitha M Rao
(74) *Attorney, Agent, or Firm* — Clark & Elbing LLP

(57) ABSTRACT

[Problem] To provide a method for treatment of adenovirus infection or disease associated with adenovirus infection. [Solution] Provided is a pharmaceutical composition for treatment of adenovirus infection or disease associated with adenovirus infection, comprising brincidofovir, a pharmaceutically acceptable salt thereof, or a solvate thereof, wherein the treatment comprises (i) intravenously administering, to a human subject, the brincidofovir, pharmaceutically acceptable salt thereof, or solvate thereof at 0.38 to 0.42 mg/kg twice weekly, or (ii) intravenously administering, to a human subject, the brincidofovir, pharmaceutically acceptable salt thereof, or solvate thereof at 18 to 22 mg/dose twice weekly.

15 Claims, 5 Drawing Sheets

(58) Field of Classification Search
CPC . A61K 9/19; A61P 31/12; A61P 31/14; A61P 31/20; A61P 31/22; Y02A 50/30
See application file for complete search history.

(56) References Cited

U.S. PATENT DOCUMENTS

| | | |
|---|---|---|
| 2013/0072460 A1 | 3/2013 | Lanier |
| 2013/0121964 A1 | 5/2013 | Apelian et al. |
| 2015/0141375 A1 | 5/2015 | Painter et al. |
| 2016/0158259 A1 | 6/2016 | Lanier |
| 2017/0281658 A1 | 10/2017 | Lanier |
| 2017/0333459 A1 | 11/2017 | Lanier et al. |
| 2017/0368082 A1 | 12/2017 | Ware et al. |
| 2018/0214464 A1 | 8/2018 | Lanier |
| 2018/0311268 A1 | 11/2018 | Schinazi |
| 2020/0138835 A1 | 5/2020 | Kabir et al. |
| 2023/0210873 A1 | 7/2023 | Kabir et al. |

FOREIGN PATENT DOCUMENTS

| | | |
|---|---|---|
| JP | 7221485 B2 | 2/2023 |
| WO | WO-2018/005676 A1 | 1/2018 |
| WO | WO-2018/156879 A1 | 8/2018 |

OTHER PUBLICATIONS

Alvarez-Cardona et al., "Brincidofovir: understanding its unique profile and potential role against adenovirus and other viral infections," Future Microbiol. 15:389-400 (Apr. 2020) (13 pages).

Chan-Tack et al., "Benefit-risk assessment for brincidofovir for the treatment of smallpox: U.S. Food and Drug Administration's Evaluation," Antiviral Res. 195:105182 (Nov. 2021) (5 pages).

Chittick et al., "Short-term clinical safety profile of brincidofovir: A favorable benefit-risk proposition in the treatment of smallpox," Antiviral Res. 143:269-77 (Jul. 2017).

Evans et al., "Monkeypox: A Mini-Review on the Globally Emerging Orthopoxvirus," Int J Environ Res Public Health. 19(23):15684 (Nov. 2022) (7 pages).

Extended European Search Report dated Dec. 5, 2024 for European Patent Application No. 24173180.1, Fukushima et al., "Intravenous Administration of Brincidofovir for the Treatment of Adenovirus Infection or Disease Associated with Adenovirus Infection" (8 pages).

Grimley et al., "Brincidofovir for Asymptomatic Adenovirus Viremia in Pediatric and Adult Allogeneic Hematopoietic Cell Transplant Recipients: A Randomized Placebo-Controlled Phase II Trial," Biol Blood Marrow Transplant. 23(3):512-21 (Mar. 2017).

Hanaoka et al., "Sensitivity of Human Mastadenovirus, the Causal Agent of Pharyngoconjunctival Fever, Epidemic Keratoconjunctivitis, and Hemorrhagic Cystitis in Immunocompromised Individuals, to Brincidofovir," Microbiol Spectr. 10(1):e0156921 (Epub Feb. 2022) (3 pages).

Marty et al., "CMX001 to prevent cytomegalovirus disease in hematopoietic-cell transplantation," N Engl J Med. 369(13):1227-36 (Sep. 2013).

Naderer et al., "1421. IV Brincidofovir (BCV): Pharmacokinetics (PK) and Safety of Multiple Ascending Doses (MAD) in Healthy Subjects," Open Forum Infect Dis. 5(Suppl 1):S438-9 (Nov. 2018).

Office Action dated Nov. 8, 2023 for Japanese Patent Application No. 2023-165960 (English translation) (4 pages).

Painter et al., "First pharmacokinetic and safety study in humans of the novel lipid antiviral conjugate CMX001, a broad-spectrum oral drug active against double-stranded DNA viruses," Antimicrob Agents Chemother. 56(5):2726-34 (May 2012).

Ramsay et al., "Disseminated adenovirus infection after allogeneic stem cell transplant and the potential role of brincidofovir—Case series and 10 year experience of management in an adult transplant cohort," J Clin Virol. 96:73-9 (Epub Oct. 2017).

Fig.4

| Cohort | Patient | W1D1 | W2D1 | W3D1 | W4D1 | W5D1 | W6D1 | W7D1 | W8D1 | W9D1 | W10D1 | W11D1 | W12D1 | W13D1 | W14D1 |
|---|---|---|---|---|---|---|---|---|---|---|---|---|---|---|---|
| C1 | 104-01 | D | D | D | D | D |  | D |  |  |  |  |  |  |  |
| C1 | 101-02 | NP | NP | NP | NP | D | NP | NP | NP | NP | NP | NP | NP | NP | NP |
| C1 | 101-03 | ND | NP | D | NP | NP |  |  |  |  |  |  |  |  |  |
| C1 | 101-04 | NP |  |  | D |  |  |  |  |  |  |  |  |  |  |
| C1 | 105-01 | D | D | D |  |  |  |  |  |  |  |  |  |  |  |
| C1 | 101-01 | D | D | D | D |  | D |  |  | D |  |  | D | D | D |
| C1 | 101-06 | D | D | D | D | D | D | D | D | NP | NP | NP | NP | NP | NP |
| C1 | 109-01 | D | D | D | D | D |  |  |  | D |  |  |  |  |  |
| C2 | 101-09 | NP | NP | NP | NP | NP | NP | NP | NP | NP | NP | NP | NP | NP | NP |
| C2 | 110-02 | D | D | D | NP | D | NP | D | D | D | D | D | D |  |  |
| C2 | 101-10 | D | D | D | NP | D | NP | NP | NP | NP | NP | NP |  |  |  |
| C2 | 109-03 | ND | NP | NP | ND | ND | ND | D | ND | D |  |  |  |  |  |
| C2 | 110-03 | NP | NP | D | NP | NP | NP | NP | D | D |  |  |  |  |  |
| C2 | 101-11 | NP | D | D | NP | NP | NP | D | NP | D |  |  |  |  |  |
| C2 | 101-12 | NP | NP | D | NP | NP | NP | D | NP | D |  |  |  |  |  |
| C2 | 101-14 | D | D | NP | NP | NP | NP | NP | D |  |  |  |  |  |  |
| C2 | 102-01 | ND | D | NP | D | D | ND | NP | NP | ND | ND |  |  |  |  |
| C2 | 101-15 | D | D | D | D | D | D | NP | D | ND | ND | ND | ND |  |  |
| C3 | 102-02 | D | NP | ND | ND | ND | ND | NP | NP | ND | NP | NP | ND |  |  |
| C3 | 110-04 | NP | NP | D | D | D |  |  |  |  |  |  |  |  |  |
| C3 | 110-05 | D | D | NP | ND | D |  |  |  |  |  |  |  |  |  |
| C3 | 109-04 | D | D | D |  | ND |  |  |  | ND |  |  |  |  |  |
| C3 | 110-06 | NP | NP | ND |  |  |  |  |  |  |  |  |  |  |  |
| C3 | 110-07 | D | D | D | D |  |  |  |  |  |  |  |  |  |  |
| C3 | 110-08 | D | NP | NP | NP |  |  |  |  | ND |  |  |  |  |  |
| C3 | 101-18 | D | D | D |  |  | D | D |  |  |  |  |  |  |  |
| C3 | 101-19 | D | D | D |  |  | D | D |  |  |  |  |  |  |  |

TREATMENT OF ADENOVIRUS INFECTION OR DISEASE ASSOCIATED WITH ADENOVIRUS INFECTION

TECHNICAL FIELD

The technical field of the present invention relates to treatment of adenovirus infection or disease associated with adenovirus infection.

BACKGROUND ART

Brincidofovir (BCV) has been approved by the U.S. Food and Drug Administration (FDA) in 2021 as a drug for treating smallpox. Non-Patent Literature 1 describes the benefit-risk assessment of BCV for the treatment of smallpox. In addition, Non-Patent Literature 2 states that monkeypox began to spread in May 2022 and that the use of BCV is recommended for management of confirmed cases with the disease.

CITATION LIST

Non-Patent Literature

[Non-Patent Literature 1] "Benefit-risk assessment for brincidofovir for the treatment of smallpox: U.S. Food and Drug Administration's Evaluation" Chan-Tack et al., Antiviral Res., 2021 Nov.; 195:105182.
[Non-Patent Literature 2] "Monkeypox: A Mini-Review on the Globally Emerging Orthopoxvirus" Evans et al., Int J Environ Res Public Health, 2022 Nov. 25; 19(23): 15684.

SUMMARY OF INVENTION

Technical Problem

Many unknown points remain regarding the effectiveness of BCV in treating adenovirus infection or disease associated with adenovirus infection, as well as the treatment method.

On the other hand, as described in the Examples below, the present inventors have found that intravenous administration of BCV in a specific dose and dosage has a remarkable therapeutic effect on adenovirus infection or disease associated with adenovirus infection.

Solution to Problem

An aspect of the present invention provides a pharmaceutical composition for treatment of adenovirus infection or disease associated with adenovirus infection, comprising brincidofovir, a pharmaceutically acceptable salt thereof, or a solvate thereof, wherein the treatment comprises (i) intravenously administering, to a human subject, the brincidofovir, pharmaceutically acceptable salt thereof, or solvate thereof at 0.38 to 0.42 mg/kg twice weekly, or (ii) intravenously administering, to a human subject, the brincidofovir, pharmaceutically acceptable salt thereof, or solvate thereof at 18 to 22 mg/dose twice weekly. This pharmaceutical composition may be used to exert a remarkable therapeutic effect on adenovirus infection or disease associated with adenovirus infection.

BRIEF DESCRIPTION OF DRAWINGS

FIG. 4 shows the results of the detection of AdV in stools.

DESCRIPTION OF EMBODIMENTS

Figure 1:
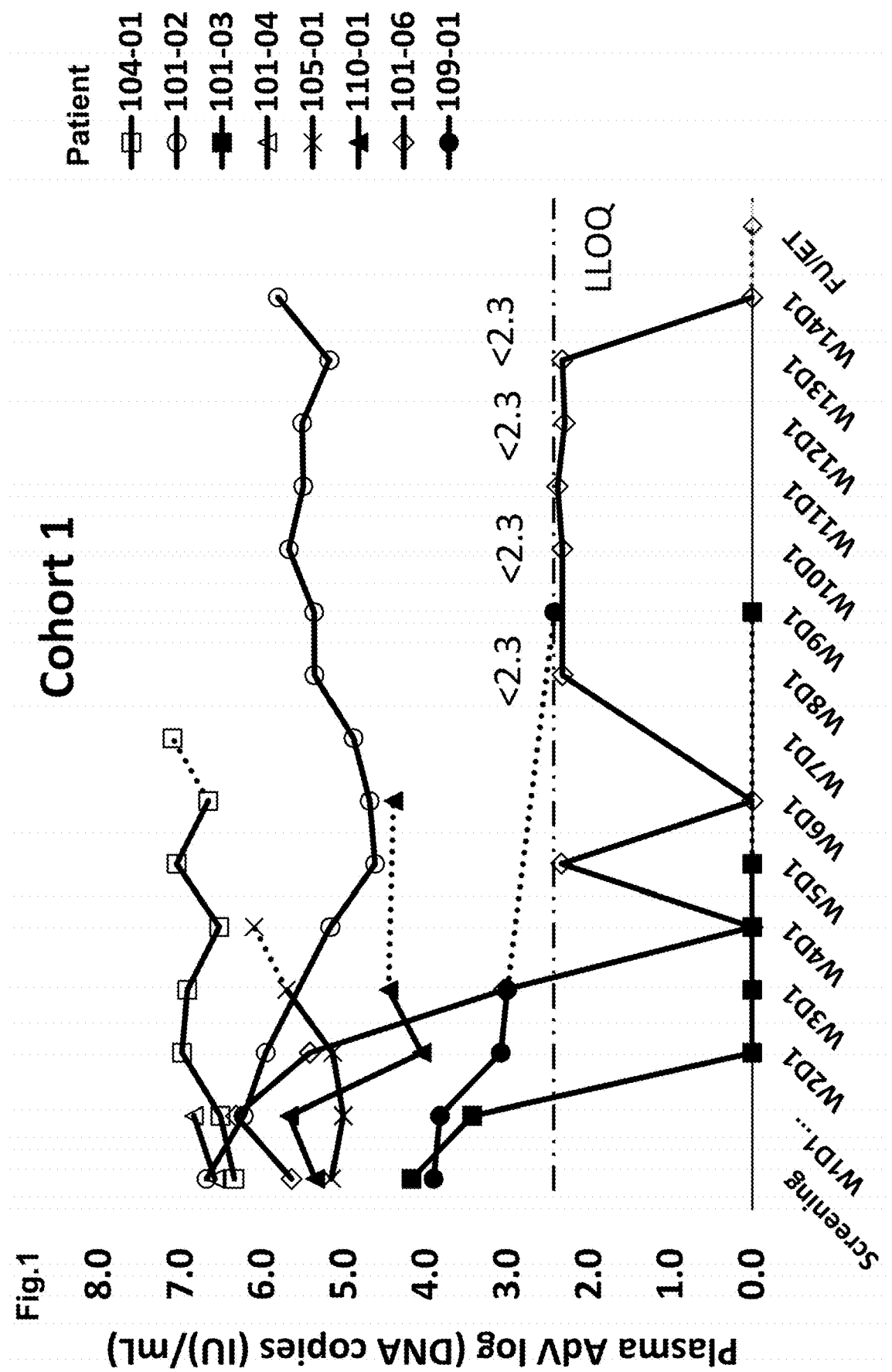
FIG. 1 shows viral load of adenovirus (AdV) in patients in cohort 1.

Hereinafter, embodiments of the present invention will be described in detail. Note that repeated descriptions of the same content are omitted, if appropriate, so as to avoid redundancy.

(1) Method

An embodiment of the present invention provides a method for treatment of adenovirus (AdV) infection or disease associated with AdV infection, comprising the step of administering, to a subject, brincidofovir (BCV), a pharmacologically acceptable salt thereof, or a solvate thereof. In this method, the administration step may comprise (i) a step of intravenously administering, to a subject, the BCV, pharmaceutically acceptable salt thereof, or solvate thereof at 0.38 to 0.42 mg/kg twice weekly, or (ii) a step of intravenously administering, to a subject, the BCV, pharmaceutically acceptable salt thereof, or solvate thereof at 18 to 22 mg/dose twice weekly. This method may be used to reduce the number of patients who do not respond to the treatment, shorten the time until the levels of viral load of AdV reaches below the detection limit (LOD), shorten the duration of treatment, or provide a treatment with superior safety.

(2) Method

An embodiment of the present invention provides a method for treatment of AdV infection or disease associated with AdV infection, comprising the step of administering, to a subject, BCV, a pharmacologically acceptable salt thereof, or a solvate thereof,
    the administration step comprising (i) a step of administering, to a subject having a body weight of less than a specific body weight, the BCV, pharmaceutically acceptable salt thereof, or solvate thereof at 0.38 to 0.42 mg/kg twice weekly, or (ii) a step of intravenously administering, to a subject having a body weight of the specific body weight or more, the BCV, pharmaceutically acceptable salt thereof, or solvate thereof at 18 to 22 mg/dose twice weekly, wherein the specific body weights in (i) and (ii) are identical and 48 to 52 kg. This method may be used to reduce the number of patients who do not respond to the treatment, shorten the time until the levels of viral load of AdV reaches below the LOD, shorten the duration of treatment, or provide a treatment with superior safety.

(3) Method

An embodiment of the present invention provides a method for treatment of AdV infection or disease associated with AdV infection, comprising the step of administering, to a subject, BCV, a pharmacologically acceptable salt thereof, or a solvate thereof,
    the administration step comprising (i) a step of intravenously administering, to a subject, the BCV, pharmaceutically acceptable salt thereof, or solvate thereof at 0.38 to 0.42 mg/kg twice weekly (provided that in a case of dosing in combination with cyclosporine, the dose of the BCV, pharmaceutically acceptable salt thereof, or solvate thereof is reduced to 55 to 65%) or (ii) a step of intravenously administering, to a subject, the BCV, pharmaceutically acceptable salt thereof, or solvate thereof at 18 to 22 mg/dose twice weekly (provided that in a case of dosing in combination with cyclosporine, the dose of the BCV, pharmaceutically acceptable salt thereof, or solvate thereof is reduced to 55 to 65%). This method may be used to reduce the number of patients who do not respond to the treatment, shorten the time until the levels of viral load of AdV reaches below the LOD, shorten the duration of treatment, or provide a treatment with superior safety.

(4) Method

An embodiment of the present invention provides a method for treatment of AdV infection or disease associated with AdV infection, comprising the step of administering, to a subject, BCV, a pharmacologically acceptable salt thereof, or a solvate thereof,
the administration step comprising, when implemented without dosing cyclosporine in combination with the BCV, pharmaceutically acceptable salt thereof, or solvate thereof, (i) a step of intravenously administering, to a subject, the BCV, pharmaceutically acceptable salt thereof, or solvate thereof at 0.38 to 0.42 mg/kg twice weekly, or (ii) a step of intravenously administering, to a subject, the BCV, pharmaceutically acceptable salt thereof, or solvate thereof at 18 to 22 mg/dose twice weekly, or the administration step comprising, when implemented while dosing cyclosporine in combination with the BCV, pharmaceutically acceptable salt thereof, or solvate thereof, (i) a step of intravenously administering, to a subject, the BCV, pharmaceutically acceptable salt thereof, or solvate thereof at 0.21 to 0.27 mg/kg twice weekly, or (ii) a step of intravenously administering, to a subject, the BCV, pharmaceutically acceptable salt thereof, or solvate thereof at 9.9 to 14.3 mg/dose twice weekly. This method may be used to reduce the number of patients who do not respond to the treatment, shorten the time until the levels of viral load of AdV reaches below the LOD, shorten the duration of treatment, or provide a treatment with superior safety.

(5) Method

An embodiment of the present invention provides a method for treatment of AdV infection or disease associated with AdV infection, comprising the step of administering, to a subject, BCV, a pharmacologically acceptable salt thereof, or a solvate thereof,
the administration step comprising (i) a step of intravenously administering, to a subject, the BCV, pharmaceutically acceptable salt thereof, or solvate thereof at 0.38 to 0.42 mg/kg twice weekly, or (ii) a step of intravenously administering, to a subject, the BCV, pharmaceutically acceptable salt thereof, or solvate thereof at 18 to 22 mg/dose twice weekly, wherein the subject is a patient who is not receiving BCV in combination with cyclosporine, or the administration step comprising (i) a step of intravenously administering, to a subject, the BCV, pharmaceutically acceptable salt thereof, or solvate thereof at 0.21 to 0.27 mg/kg twice weekly, or (ii) a step of intravenously administering, to a subject, the BCV, pharmaceutically acceptable salt thereof, or solvate thereof at 9.9 to 14.3 mg/dose twice weekly, wherein the subject is a patient who is receiving BCV in combination with cyclosporine. This method may be used to reduce the number of patients who do not respond to the treatment, shorten the time until the levels of viral load of AdV reaches below the LOD, shorten the duration of treatment, or provide a treatment with superior safety.

(6) Method

An embodiment of the present invention provides a method for treatment of AdV infection or disease associated with AdV infection, comprising the step of administering, to a subject, BCV, a pharmacologically acceptable salt thereof, or a solvate thereof,
the administration step comprising (i) a step of administering, to a subject, the BCV, pharmaceutically acceptable salt thereof, or solvate thereof at 0.38 to 0.42 mg/kg twice weekly, or (ii) a step of intravenously administering, to a subject, the BCV, pharmaceutically acceptable salt thereof, or solvate thereof at 18 to 22 mg/dose twice weekly, wherein a period of the administration is terminated based on treatment stopping criteria and the treatment stopping criteria includes a case where a four-week treatment has been completed. This method may be used to shorten the duration of treatment especially since the end of administration can be determined at an early stage in view of a patient response predicted from the specific dose and dosage described above.

(7) Method

An embodiment of the present invention provides a method for treatment of AdV infection or disease associated with AdV infection, comprising the step of administering, to a subject, BCV, a pharmacologically acceptable salt thereof, or a solvate thereof,
the administration step comprising (i) a step of administering, to a subject, the BCV, pharmaceutically acceptable salt thereof, or solvate thereof at 0.38 to 0.42 mg/kg twice weekly, or (ii) a step of intravenously administering, to a subject, the BCV, pharmaceutically acceptable salt thereof, or solvate thereof at 18 to 22 mg/dose twice weekly, wherein a period of the administration is terminated based on fulfillment of both conditions: (a) a case where viral load of AdV in sample of the subject is measured multiple times, and the levels of viral load of AdV is below the LOD in two consecutive assays and (b) a case where a four-week of treatment has been completed. This method may be used to shorten the duration of treatment especially since the end of administration can be determined at an early stage in view of a patient response predicted from the specific dose and dosage described above.

(8) Method

An embodiment of the present invention provides a method for treatment of AdV infection or disease associated with AdV infection, comprising the step of administering, to a subject, BCV, a pharmacologically acceptable salt thereof, or a solvate thereof,
the administration step comprising (i) a step of administering, to a subject, the BCV, pharmaceutically acceptable salt thereof, or solvate thereof at 0.38 to 0.42 mg/kg twice weekly, or (ii) a step of intravenously administering, to a subject, the BCV, pharmaceutically acceptable salt thereof, or solvate thereof at 18 to 22 mg/dose twice weekly, wherein a period of the administration is terminated based on fulfillment of both conditions: (a) a case where viral load of AdV in sample of the subject is measured multiple times, and the test result is negative in two consecutive assays and (b) a case where a four-week of treatment has been completed. This method may be used to shorten the duration of treatment especially since the end of administration can be determined at an early stage in view of a patient response predicted from the specific dose and dosage described above.

(9) Method

An embodiment of the present invention provides a method for treatment of AdV infection or disease associated with AdV infection, comprising the step of administering, to a subject, a pharmaceutical composition containing BCV, a pharmacologically acceptable salt thereof, or a solvate thereof, the administration step comprising (i) a step of administering, to a subject, the pharmaceutical composition in a dose corresponding to 0.38 to 0.42 mg/kg of the BCV, pharmaceutically acceptable salt thereof, or solvate thereof twice weekly, or (ii) a step of intravenously administering, to a subject, the pharmaceutical composition in a dose corresponding to 18 to 22 mg/dose of the BCV, pharmaceutically acceptable salt thereof, or solvate thereof twice weekly. This method may be used to reduce the number of patients who do not respond to the treatment, shorten the time until the levels of viral load of AdV reaches below the LOD, shorten the duration of treatment, or provide a treatment with superior safety. From another aspect, an embodiment of the present invention provides a method for treatment of AdV infection or disease associated with AdV infection, comprising the step of administering, to a subject, a pharmaceutical composition containing BCV, a pharmacologically acceptable salt thereof, or a solvate thereof, the administration step comprising (i) a step of administering, to a subject, the pharmaceutical composition in a dose corresponding to 0.38 to 0.42 mg/kg of the BCV twice weekly, or (ii) a step of intravenously administering, to a subject, the pharmaceutical composition in a dose corresponding to 18 to 22 mg/dose of the BCV twice weekly. From another aspect, an embodiment of the present invention provides a method for treatment of AdV infection or disease associated with AdV infection, comprising the steps of: administering, to a subject, a pharmaceutical composition containing BCV, a pharmacologically acceptable salt thereof, or a solvate thereof; and measuring an viral load of AdV in sample (e.g., blood or stool) of the subject. From another aspect, an embodiment of the present invention provides a treatment method of reducing viral load of AdV in sample (e.g., blood or stool) of a subject, comprising the step of administering, to the subject, a pharmaceutical composition containing BCV, a pharmacologically acceptable salt thereof, or a solvate thereof.

(10) Method

An embodiment of the present invention provides a method for treatment of AdV infection or disease associated with AdV infection, comprising the step of administering, to a human subject, BCV, a pharmaceutically acceptable salt thereof, or a solvate thereof, the administration step comprising (i) a step of intravenously administering, to a subject having a body weight of less than 50 kg, the BCV, pharmaceutically acceptable salt thereof, or solvate thereof at 0.4 mg/kg twice weekly (provided that in a case of dosing in combination with cyclosporine, the dose of the BCV is reduced to 60%) or (ii) a step of intravenously administering, to a subject having a body weight of 50 kg or more, the BCV, pharmaceutically acceptable salt thereof, or solvate thereof at 20 mg/dose twice weekly (provided that in a case of dosing in combination with cyclosporine, the dose of the BCV is reduced to 60%) wherein a period of the administration is terminated based on fulfillment of both conditions: (a) a case where viral load of AdV in sample of the subject is measured multiple times, and the levels of viral load of AdV is below the LOD in two consecutive assays and (b) a case where a four-week of treatment has been completed, and the administration is by intravenous drip infusion (e.g., continuous intravenous drip infusion) over a period of 2 hours and the human subject is an allogeneic hematopoietic cell transplant recipient. This method may be used to reduce the number of patients who do not respond to the treatment, shorten the time until levels of the viral load of AdV reaches below the LOD, shorten the duration of treatment, or provide a treatment with superior safety.

(11) Method

An embodiment of the present invention provides a method for treatment of AdV infection or disease associated with AdV infection, comprising the step of administering, to a subject, BCV, a pharmacologically acceptable salt thereof, or a solvate thereof, the administration step optionally comprising (i) a step of intravenously administering, to a subject, the BCV, pharmaceutically acceptable salt thereof, or solvate thereof at 0.38 to 0.42 mg/kg weekly, or (ii) a step of intravenously administering, to a subject, the BCV, pharmaceutically acceptable salt thereof, or solvate thereof at 18 to 22 mg/dose weekly. This method may be used to treat AdV infection or disease associated with AdV infection.

(12) Method

An embodiment of the present invention provides a method for treatment of AdV infection or disease associated with AdV infection, comprising the step of administering, to a subject, BCV, a pharmacologically acceptable salt thereof, or a solvate thereof, the administration step optionally comprising (i) a step of intravenously administering, to a subject, the BCV, pharmaceutically acceptable salt thereof, or solvate thereof at 0.58 to 0.62 mg/kg weekly, or (ii) a step of intravenously administering, to a subject, the BCV, pharmaceutically acceptable salt thereof, or solvate thereof at 28 to 32 mg/dose weekly. This method may be used to treat AdV infection or disease associated with AdV infection.

(13) Method

An embodiment of the present invention provides a method for treatment of AdV infection or disease associated with AdV infection, comprising the step of administering, to a subject, BCV, a pharmaceutically acceptable salt thereof, or a solvate thereof, the administration step comprising (i) a step of intravenously administering, to a subject, the BCV, pharmaceutically acceptable salt thereof, or solvate thereof at 0.78 to 0.82 mg/kg weekly, or (ii) a step of intravenously administering, to a subject, the BCV, pharmaceutically acceptable salt thereof, or solvate thereof at 38 to 42 mg/dose weekly. This method may be used to treat AdV infection or disease associated with AdV infection.

(14) Method

An embodiment of the present invention provides a method for treatment of AdV infection or disease associated with AdV infection, comprising the step of administering, to a subject, BCV, a pharmacologically acceptable salt thereof, or a solvate thereof,
the administration step optionally comprising (i) a step of intravenously administering, to a subject, the BCV, pharmaceutically acceptable salt thereof, or solvate thereof at 0.38 to 0.82 mg/kg weekly, or (ii) a step of intravenously administering, to a subject, the BCV, pharmaceutically acceptable salt thereof, or solvate thereof at 18 to 42 mg/dose weekly. This method may be used to treat AdV infection or disease associated with AdV infection.

(15) Method

The method according to any one of the embodiments (e.g., (1) to (14) above) of the present invention may comprise, for example, (i) a step of testing whether or not the subject suffers from AdV infection or disease associated with AdV infection; (ii) a step of identifying a subject with AdV infection or disease associated with AdV infection; (iii) a step of identifying a subject in need of treatment of AdV infection or disease associated with AdV infection; (iv) a step of identifying a subject in need of prevention of AdV infection or disease associated with AdV infection; (v) a step of identifying a subject after allogeneic or autologous transplantation (e.g., hematopoietic cell transplantation); (vi) a step of identifying a subject under immunosuppressed conditions; (vii) a step of identifying a subject after administration of an immunosuppressant; or (viii) a step of identifying a patient with immunodeficiency syndrome. Also, the method according to any one of the embodiments (e.g., (1) to (14) above) of the present invention may or may not comprise, for example, when specified: a step of identifying a subject having cytomegalovirus (CMV), BK virus (BKV), EB virus (EBV), or variola virus (VaV) infection, or a method for preventing or treating a disease associated with CMV, BKV, EBV, or VaV infection.

(16) Composition

An embodiment of the present invention provides a pharmaceutical composition for treatment of AdV infection or disease associated with AdV infection, comprising BCV, a pharmacologically acceptable salt thereof, or a solvate thereof, wherein the treatment comprises (i) intravenously administering, to a subject, the BCV, pharmaceutically acceptable salt thereof, or solvate thereof at 0.38 to 0.42 mg/kg twice weekly, or (ii) intravenously administering, to a subject, the BCV, pharmaceutically acceptable salt thereof, or solvate thereof at 18 to 22 mg/dose twice weekly. This pharmaceutical composition may be used to reduce the number of patients who do not respond to the treatment, shorten the time until levels of the viral loads reaches below the LOD, or shorten the duration of treatment.

(17) Composition

An embodiment of the present invention provides a pharmaceutical composition for treatment of AdV infection or disease associated with AdV infection, comprising BCV, a pharmacologically acceptable salt thereof, or a solvate thereof, wherein the treatment comprises (i) intravenously administering, to a subject having a body weight of less than a specific body weight, the BCV, pharmaceutically acceptable salt thereof, or solvate thereof at 0.38 to 0.42 mg/kg twice weekly, or (ii) intravenously administering, to a subject having a body weight of the specific body weight or more, the BCV, pharmaceutically acceptable salt thereof, or solvate thereof at 18 to 22 mg/dose twice weekly, and the specific body weights in (i) and (ii) are identical and are from 48 to 52 kg. This pharmaceutical composition may be used to reduce the number of patients who do not respond to the treatment, shorten the time until levels of viral load reaches below the LOD, or shorten the duration of treatment.

(18) Composition

An embodiment of the present invention provides a pharmaceutical composition for treatment of AdV infection or disease associated with AdV infection, comprising BCV, a pharmacologically acceptable salt thereof, or a solvate thereof, wherein the treatment comprises (i) intravenously administering, to a subject, the BCV, pharmaceutically acceptable salt thereof, or solvate thereof at 0.38 to 0.42 mg/kg twice weekly (provided that in a case of dosing in combination with cyclosporine, the dose of the BCV is reduced to 55 to 65%) or (ii) intravenously administering, to a subject, the BCV, pharmaceutically acceptable salt thereof, or solvate thereof at 18 to 22 mg/dose twice weekly (provided that in a case of dosing in combination with cyclosporine, the dose of the BCV is reduced to 55 to 65%). This pharmaceutical composition may be used to reduce the number of patients who do not respond to the treatment, shorten the time until levels of the viral loads reaches below the LOD, or shorten the duration of treatment.

(19) Composition

An embodiment of the present invention provides a pharmaceutical composition for treatment of AdV infection or disease associated with AdV infection, comprising BCV, a pharmacologically acceptable salt thereof, or a solvate thereof, wherein the treatment comprises (i) intravenously administering, to a subject, the BCV, pharmaceutically acceptable salt thereof, or solvate thereof at 0.38 to 0.42 mg/kg twice weekly, or (ii) intravenously administering, to a subject, the BCV, pharmaceutically acceptable salt thereof, or solvate thereof at 18 to 22 mg/dose twice weekly, and wherein in the treatment, a period of dosing the BCV, pharmaceutically acceptable salt thereof, or solvate thereof is terminated based on fulfillment of both conditions: (a) a case where viral load of AdV in sample of the subject is measured multiple times, and the levels of viral load of AdV is below the LOD in two consecutive assays and (b) a case where a four-week of treatment has been completed. This pharmaceutical composition may be used to shorten the duration of treatment especially since the end of administration can be determined at an early stage in view of a patient response predicted from the specific dose and dosage described above.

(20) Composition

An embodiment of the present invention provides a pharmaceutical composition for treatment of AdV infection or disease associated with AdV infection, comprising BCV, a pharmacologically acceptable salt thereof, or a solvate thereof, wherein the treatment comprises (i) intravenously administering, to a human subject, the pharmaceutical composition in a dose corresponding to 0.38 to 0.42 mg/kg of the BCV, pharmaceutically acceptable salt thereof, or solvate thereof twice weekly, or (ii) intravenously administering, to a human subject, the pharmaceutical composition in a dose corresponding to 18 to 22 mg/dose of the BCV, pharmaceutically acceptable salt thereof, or solvate thereof twice weekly. This pharmaceutical composition may be used to reduce the number of patients who do not respond to the treatment, shorten the time until the levels of the viral load reaches below the LOD, or shorten the duration of treatment. From another aspect, an embodiment of the present invention provides a pharmaceutical composition for treatment of AdV infection or disease associated with AdV infection, comprising BCV, a pharmacologically acceptable salt thereof, or a solvate thereof, wherein the treatment comprises (i) intravenously administering, to a human subject, the pharmaceutical composition in a dose corresponding to 0.38 to 0.42 mg/kg of the BCV twice weekly, or (ii) intravenously administering, to a human subject, the pharmaceutical composition in a dose corresponding to 18 to 22 mg/dose of the BCV twice weekly.

(21) Composition

An embodiment of the present invention provides a pharmaceutical composition for treatment of AdV infection or disease associated with AdV infection, comprising BCV, a pharmacologically acceptable salt thereof, or a solvate thereof, wherein the treatment comprises (i) intravenously administering, to a subject having a body weight of less than 50 kg, the BCV, pharmaceutically acceptable salt thereof, or solvate thereof at 0.4 mg/kg twice weekly (provided that in a case of dosing in combination with cyclosporine, the dose of the BCV is reduced to 60%) or (ii) intravenously administering, to a subject having a body weight of 50 kg or more, the BCV, pharmaceutically acceptable salt thereof, or solvate thereof at 20 mg/dose twice weekly (provided that in a case of dosing in combination with cyclosporine, the dose of the BCV is reduced to 60%), wherein in the treatment, a period of dosing the BCV, pharmaceutically acceptable salt thereof, or solvate thereof is terminated based on fulfillment of both conditions: (a) a case where viral load of AdV in sample of the subject is measured multiple times, and the levels of viral load of AdV is below the LOD in two consecutive assays and (b) a case where a four-week of treatment has been completed, and wherein in the treatment, the BCV, pharmaceutically acceptable salt thereof, or solvate thereof is administered by continuous intravenous drip infusion over 2 hours. This pharmaceutical composition may be used to reduce the number of patients who do not respond to the treatment, shorten the time until the levels of viral load of AdV reaches below the LOD, or shorten the duration of treatment.

(22) Composition

An embodiment of the present invention provides a pharmaceutical composition comprising BCV, a pharmaceutically acceptable salt thereof, or a solvate thereof for use in the method according to any one of (1) to (15) above.

(23) Kit

An embodiment of the present invention provides a kit comprising the pharmaceutical composition according to any one of (16) to (22) above. The kit may contain, for example, a package insert, a buffer solution, a container, or packaging.

(24) Use

An embodiment of the present invention provides use of BCV, a pharmaceutically acceptable salt thereof, or a solvate thereof for the manufacture of the pharmaceutical composition according to any one of (16) to (22) above.

In embodiments (e.g., (1) to (24) above) of the present invention, brincidofovir (BCV) includes a compound having the structure represented by the formula below. BCV may also be denoted by the IUPAC name of [(2S)-1-(4-amino-2-oxopyrimidin-1-yl)-3-hydroxypropan-2-yl]oxymethyl-(3-hexadecoxypropoxy)phosphinic acid. BCV includes the compound indicated by the CAS registration number of 444805-28-1. As used herein, BCV is short for brincidofovir, and they have the same meaning.

[Chemical Formula 1]

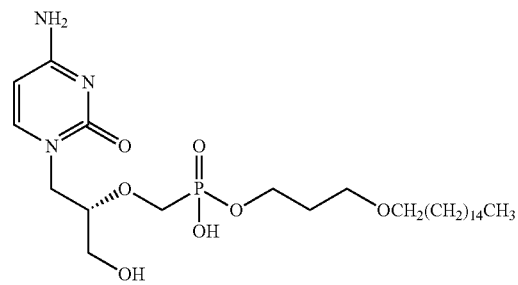

In embodiments (e.g., (1) to (24) above) of the present invention, adenovirus (AdV) includes, for example, a type of deoxyribonucleic acid (DNA) virus that can cause AdV infection. As used herein, AdV stands for Adenovirus and they have the same meaning. AdV includes viruses of the family Adenoviridae. Examples of the viruses of the family Adenoviridae include viruses of the genus *Mastadenovirus*. The therapeutic effect on AdV infection or disease associated with AdV infection may be evaluated, for example, by monitoring the amount of AdV in sample of the subject after administration of the pharmaceutical composition. The treatment effect may be evaluated based on the fact that the amount of AdV shows a decreasing trend. If the amount of AdV is significantly lower than that before the administration of the pharmaceutical composition or the negative control, it may be judged that a therapeutic effect is present. The amount of AdV may be measured, for example, by a method to determine the amount of AdV DNA (e.g., quantitative polymerase chain reaction (PCR) or immunochromatography). The measurement may be quantitative or qualitative.

In embodiments (e.g., (1) to (24) above) of the present invention, examples of the disease associated with AdV infection include diseases caused by AdV infection. Examples of the disease associated with AdV infection include AdV viremia, fever associated with AdV infection, symptomatic or asymptomatic AdV infection associated with the following organ disorder, disseminated AdV infection associated with multiple organ dysfunction or systemic symptoms, deterioration of general condition due to AdV infection or death resulting therefrom, AdV myocarditis, AdV central nervous system (CNS) infection, AdV kidney infection, gastrointestinal disease (e.g., hepatitis or gastroenteritis) associated with AdV infection, respiratory tract infection (e.g., airway infection (e.g., rhinitis, pharyngitis, or tonsillitis) or pneumonia) associated with AdV infection, ocular diseases associated with AdV infection (e.g., epidemic keratoconjunctivitis), pharyngoconjunctival fever associated with AdV infection, or AdV hemorrhagic cystitis.

In embodiments (e.g., (1) to (24) above) of the present invention, the "0.38 to 0.42 mg/kg" as the amount of BCV, pharmaceutically acceptable salt thereof, or solvate thereof is more preferably 0.39 to 0.41 mg/kg and most preferably 0.4 mg/kg from the viewpoint of more effective treatment of AdV infection or disease associated with AdV infection. Examples of the effective treatment include reducing the number of patients who do not respond to the treatment, shortening the time until the levels of viral load reaches below the LOD, shortening the duration of treatment, or providing a treatment with superior safety. The "0.38 to 0.42 mg/kg" may be 0.38, 0.39, 0.4, 0.41, or 0.42 mg/kg, or may be between any two of these values.

In embodiments (e.g., (1) to (24) above) of the present invention, the "0.58 to 0.62 mg/kg" as the amount of BCV, pharmaceutically acceptable salt thereof, or solvate thereof may be 0.59 to 0.61 mg/kg or 0.6 mg/kg. The "0.58 to 0.62 mg/kg" may be 0.58, 0.59, 0.6, 0.61, or 0.62 mg/kg, or may be between any two of these values. The "0.78 to 0.82 mg/kg" may be 0.79 to 0.81 mg/kg or 0.8 mg/kg. The "0.78 to 0.82 mg/kg" may be 0.78, 0.79, 0.8, 0.81, or 0.82 mg/kg, or may be between any two of these values. The "0.38 to 0.82 mg/kg" may be 0.39 to 0.81 mg/kg, 0.4 to 0.8 mg/kg, or 0.4, 0.6, or 0.8 mg/kg. The "0.38 to 0.82 mg/kg" may be 0.38, 0.4, 0.42, 0.5, 0.58, 0.6, 0.62, 0.7, 0.78, 0.8, or 0.82 mg/kg, or may be between any two of these values.

In embodiments (e.g., (1) to (24) above) of the present invention, the "18 to 22 mg/dose" as the amount of BCV, pharmaceutically acceptable salt thereof, or solvate thereof is more preferably 19 to 0.21 mg/kg and most preferably 20 mg/kg from the viewpoint of more effective treatment of AdV infection or disease associated with AdV infection. Examples of the effective treatment include reducing the number of patients who do not respond to the treatment, shortening the time until the levels of viral load reaches below the LOD, shortening the duration of treatment, or providing a treatment with superior safety. The "18 to 22 mg/dose" may be 18, 19, 20, 21, or 22 mg/dose, or may be between any two of these values. The "mg/dose" may also be expressed in mg/body.

In embodiments (e.g., (1) to (24) above) of the present invention, the "28 to 32 mg/dose" as the amount of BCV, pharmaceutically acceptable salt thereof, or solvate thereof may be 29 to 31 mg/kg or 30 mg/kg. The "28 to 32 mg/dose" may be 28, 29, 30, 31, or 32 mg/dose, or may be between any two of these values. The "38 to 42 mg/dose" may be 39 to 41 mg/dose or 40 mg/dose. The "38 to 42 mg/dose" may be 38, 39, 40, 41, or 42 mg/dose, or may be between any two of these values. The "18 to 42 mg/dose" may be 19 to 41 mg/dose, 20 to 40 mg/dose, or 20, 30, or 40 mg/dose. The "18 to 42 mg/dose" may be 18, 20, 22, 25, 28, 30, 32, 35, 38, 40, or 42 mg/dose, or may be between any two of these values.

In embodiments (e.g., (1) (24) above) of the present invention, the wording "as the amount of BCV, pharmaceutically acceptable salt thereof, or solvate thereof" may mean, for example, the amount of BCV, pharmaceutically acceptable salt thereof, or solvate thereof contained in a specific amount of pharmaceutical composition when the specific amount of pharmaceutical composition is administered to a subject. For example, if a pharmaceutical composition in dose A (mg/kg or mg/dose) contains BCV, a pharmaceutically acceptable salt thereof, or a solvate thereof in dose B and an additive in dose C, the amount of BCV, pharmaceutically acceptable salt thereof, or solvate thereof is the dose B. Here, the pharmaceutical composition in a dose corresponding to the dose B as the amount of BCV, pharmaceutically acceptable salt thereof, or solvate thereof is the pharmaceutical composition in the dose A. In addition, "as the amount of BCV" may mean the amount of the BCV component contained in a specific amount of pharmaceutical composition when the specific amount of pharmaceutical composition is administered to a subject. For example, if a pharmaceutical composition in a dose D (mg/kg or mg/dose) contains BCV in a dose E and an additive in a dose F, the amount of BCV portion is the dose E. Here, the pharmaceutical composition in a dose corresponding to the dose E as the amount of BCV is the pharmaceutical composition in the dose D. For example, if a pharmaceutical composition in a dose G (mg/kg or mg/dose) contains a pharmaceutically acceptable salt of BCV in an amount of H and an additive in an amount of I, the amount of BCV portion is the amount of the portion that corresponds to the free form of BCV and is contained in the amount of H (in other words, the amount of H minus the amount of the above salt portion combined with the free form of BCV). Here, the pharmaceutical composition in a dose equivalent to the amount of the portion that corresponds to the free form of BCV and is contained in the H amount as the amount of BCV is the pharmaceutical composition in a dose G. It is common practice in the pharmaceutical field to express a dose based on the amount of active ingredient rather than on the final dose of the drug. Therefore, one skilled in the art can understand embodiments of a pharmaceutical composition or a treatment method in which the dose is expressed in terms of the amount of active ingredient.

In embodiments (e.g., (1) to (24) above) of the present invention, twice-weekly administration includes administration once on day 1, day 2, day 3, day 4, day 5, day 6, or day 7, and once on another day, when the week is divided into days 1 to 7. The twice-weekly administration is preferably performed on days 1 and 3, 4 or 5 and most preferably performed on days 1 and 4 from the viewpoint of more effective treatment of AdV infection or disease associated with AdV infection. Day 1 may be the starting day of treatment, the first day of administration, or the first day of the week, and may be Sunday, Monday, Tuesday, Wednesday, Thursday, Friday, or Saturday.

In embodiments (e.g., (1) to (24) above) of the present invention, the body weight of the subject (i) who intravenously receives the BCV, pharmaceutically acceptable salt thereof, or solvate thereof at 0.38 to 0.42 mg/kg is less than a specific body weight, the body weight of the subject (ii) who intravenously receives the BCV, pharmaceutically acceptable salt thereof, or solvate thereof at 18 to 22 mg/dose is the specific body weight or more, and the specific body weights in subjects (i) and (ii) are identical and may be 48 to 52 kg. The "48 to 52 kg" is more preferably 49 to 51 kg and most preferably 50 kg from the viewpoint of more effective treatment of AdV infection or disease associated with AdV infection. The "48 to 52 kg" may be 48, 49, 50, 51, or 52 kg, and may be between any two of these values. The specific body weight includes a given body weight.

In embodiments (e.g., (1) to (24) above) of the present invention, the period of dosing the BCV, pharmaceutically acceptable salt thereof, or solvate thereof may be terminated based on treatment stopping criteria. This treatment stopping criteria may be used to shorten the duration of treatment especially since the end of administration can be determined at an early stage in view of a patient response predicted from the specific dose and dosage described above. The treatment stopping criteria may include, for example, a case where the fourth week from the initial dosing has elapsed.

In embodiments (e.g., (1) to (24) above) of the present invention, the period of dosing the BCV, pharmaceutically acceptable salt thereof, or solvate thereof may be terminated based on fulfillment of both conditions: (a) a case where viral load of AdV in sample of the subject is measured multiple times, and the levels of viral load of AdV is below the LOD in two consecutive assays and (b) a case where a four-week of treatment has been completed. This may be used to shorten the duration of treatment especially since the end of administration can be determined at an early stage in view of a patient response predicted from the specific dose and dosage described above. The measurement in (a) above may be performed multiple times with an interval of 3 days at least. The measurement in (a) above may be performed on the same day as the day of dosing the BCV, pharmaceutically acceptable salt thereof, or solvate thereof. The measurement in (a) above may be performed on the same day as the first of the twice-weekly doses or on the same day as the second of the twice-weekly administration. The measurement in (a) above may be performed on any one or two days of day 1, 2, 3, 4, 5, 6, or 7 of the twice-weekly administration. The measurement in (a) above may be performed at least once a week or twice a week over a period of at least 4 weeks. Multiple doses may be, for example, 2, 4, 6, 8, 10, 12, 14, 16, 18, 20, or 30 or more doses, and may be a number between any two of these values. The above (a) may be satisfied when the viral load of AdV in sample of a target patient is measured multiple times and the levels of viral load of AdV is below the LOD in two most recent consecutive assays (measurements). The two most recent assays may be, for example, the two most recent measurements (e.g., at the time of the most recent measurement and at the time of the measurement immediately before the most recent measurement) based on when the decision is made whether to end the dosing period. The two most recent measurements may be, for example, the last measurement during the 4-week period and the second-to-last measurement if the dosing period ends in 4 weeks. The two most recent measurements may be, for example, when the levels of viral load of AdV does not reach below the LOD within the four-week administration period, the first measurement where the level of viral load of AdV is below the LOD after the fifth week and the next measurement. The two most recent measurements may be, for example, when the level of vral load of AdV reaches, at the first time, below the LOD at the time of the last measurement within the four-week administration period, the last measurement within the four-week administration period and the first measurement in the fifth week of administration. The 3 days or more in (a) above is preferable to 3 days or more and 14 days or less. The "3 days or more" may be, for example, 3, 4, 5, 6, 7, 8, 10, 12, or 14 days, and may be greater than or equal to one of these days or may be between any two of these days. From another viewpoint, in embodiments (e.g., (1) to (24) above) of the present invention, the period of dosing the BCV, pharmaceutically acceptable salt thereof, or solvate thereof may be terminated based on fulfillment of both conditions: (a) a case where an viral load of AdV in sample of the subject is measured multiple times, and the test result is negative in two consecutive assays and (b) a case where a fourth week of the treatment has elapsed. This may be used to shorten the duration of treatment especially since the end of administration can be determined at an early stage in view of a patient response predicted from the specific dose and dosage described above. From still another viewpoint, in embodiments (e.g., (1) to (24) above) of the present invention, the period of dosing the BCV, pharmaceutically acceptable salt thereof, or solvate thereof may be terminated in a case where viral load of AdV in sample of the subject is measured multiple times, and the level of viral load of AdV is below the LOD or negative in two consecutive assays. In this case, the duration of treatment, in particular, can be shortened because the end of dosing can be determined at an early stage.

In embodiments (e.g., (1) to (24) above) of the present invention, the fact that level of viral load of AdV is below the LOD includes, for example, that the PCR method (e.g., quantitative PCR method (e.g., real-time quantitative PCR method)) is performed and the levels of viral load of AdV does not reach as high as the LOD The term "below the LOD" may include that AdV is negative. The PCR method described above may be performed, for example, under the following conditions: LOD: 25 copies/mL; lower limit of quantification: 190 copies/mL; and upper limit of quantification: $1\times10^{10}$ copies/mL. The LOD of AdV may be, for example, 100, 75, 50, or 25 copies/mL. The AdV detection method can be found, for example, in Ison et al., Microbiol Spectr. 2016 August; 4(4).

In embodiments (e.g., (1) to (24) above) of the present invention, when treatment is carried out in an condition where cyclosporine is administered in combination with the BCV, pharmaceutically acceptable salt thereof, or solvate thereof, the dose of BCV, pharmaceutically acceptable salt thereof, or solvate thereof may be reduced to 55-65%. The dose reduced to 55-65% is the same as the original dose multiplied by 0.55-0.65. The "55-65%" is more preferably 57-63%, still more preferably 59-61%, and most preferably 60% from the viewpoint of more effective treatment of AdV infection or disease associated with AdV infection. The "55-65%" may be 55, 56, 57, 58, 59, 60, 61, 62, 63, 64, or 65%, and may be between any two of these values. In (i) above, if the BCV, pharmaceutically acceptable salt thereof, or solvate thereof is administered intravenously at 0.38 to 0.42 mg/kg twice weekly, the dose reduced to 55-65% includes 0.21 to 0.27 mg/kg. The "0.21-0.27 mg/kg" is more preferably 0.23 to 0.25 mg/kg and most preferably 0.24 mg/kg from the viewpoint of more effective treatment of AdV infection or disease associated with AdV infection. The "0.21 to 0.27 mg/kg" may be 0.21, 0.22, 0.23, 0.24, 0.25, 0.26, or 0.27 mg/kg, or may be between any two of these values. In (ii) above, if the BCV, pharmaceutically acceptable salt thereof, or solvate thereof is administered intravenously at 18 to 22 mg/dose twice weekly, the dose reduced to 55-65% includes 9.9 to 14.3 mg/dose. The "9.9 to 14.3 mg/dose" is more preferably 11 to 13 mg/dose and most preferably 12 mg/dose from the viewpoint of more effective treatment of AdV infection or disease associated with AdV infection. The "9.9 to 14.3 mg/dose" may be 9.9, 10, 11, 12, 13, 14, or 14.3 mg/dose, or may be between any two of these values.

In embodiments (e.g., (1) to (24) above) of the present invention, the dose and dosage of cyclosporine when cyclosporine is administered in combination with the BCV, pharmaceutically acceptable salt thereof, or solvate thereof, for example, the dose and dosage of cyclosporine as known or approved by the Pharmaceuticals and Medical Devices Agency (PMDA) or FDA at the time of filing this application may be adopted. For example, transplant recipients may orally receive a dose of cyclosporine in the range of 6 to 16 mg/kg/day in two divided doses per day starting on Day 1 of transplantation, and thereafter the dose may be decreased by 2 mg/kg per day or gradually. The standard maintenance dose is in the range of 2 to 6 mg/kg/day and may be adjusted according to symptoms. Cyclosporine may be administered by continuous intravenous infusion. Cyclosporine administration does not affect the blood concentration of BCV. Cyclosporine includes the compound indicated by the CAS Registry Number® 59865-13-3.

In embodiments (e.g., (1) to (24) above) of the present invention, concomitant use includes, when two or more treatments (e.g., administration) are present, a case where one treatment is used as a reference and the other treatment(s) may be performed before, simultaneously, or after the one treatment.

In embodiments (e.g., (1) to (24) above) of the present invention, the case where the 4-week treatment has passed includes, for example, a case where 4 weeks since the first dosing have elapsed, or a case where the second dose at week 4 has been completed.

In embodiments (e.g., (1) to (24) above) of the present invention, the dosing period includes, for example, a period from the time of the first dosing until the dosing is discontinued after repeated administration at a specific frequency (e.g., twice a week). For example, if the dosing is performed twice weekly for 4 weeks, the dosing period may be 4 weeks. The dosing period includes, for example, the period of continuous intravenous drip infusion and the interval period (e.g., the period during which no continuous intravenous drip infusion is given). The dosing period includes the duration of treatment.

In the method according to any one of embodiments (e.g., (1) to (15) above) of the present invention, the step of identifying the subject may include a step of identifying the subject as a therapeutic target or as a target for administration of the pharmaceutical composition. The step of identifying the subject may include a step of selecting or specifying the subject.

In embodiments (e.g., (1) to (24) above) of the present invention, a subject with AdV infection or disease associated with AdV infection may be identified based on the detection of AdV DNA in a sample (e.g., blood) of the subject to be tested, a significantly larger amount of AdV DNA in the sample than in a control subject (e.g., a healthy person), or AdV DNA present in the sample at 1000 copies/ml or more or 10,000 copies/ml or more.

In embodiments (e.g., (1) to (24) above) of the present invention, the sample may include, for example, a biological sample. Examples of the sample include body fluid (e.g., blood (e.g., plasma, serum, or whole blood), throat swab, saliva, urine, or spinal fluid), sputum, or stool. The sample may contain, for example, a specimen. In the treatment of a subject, the treatment effect may be evaluated based on the viral load of AdV in the subject's sample, and the amount of AdV may be used as an indicator for treatment discontinuation.

In embodiments (e.g., (1) to (24) above) of the present invention, the treatment includes potentially exerting an action (e.g., amelioration, mitigation, relief, cure, remission or inhibition (e.g., suppression (e.g., prevention), progression suppression, or recurrence suppression) that produces a beneficial result for a patient with respect to the patient's disease (e.g., AdV infection or disease associated with AdV infection) or one or more symptoms associated with the disease. The treatment is implemented by administering, to a subject, the BCV, pharmaceutically acceptable salt thereof, or solvate thereof at a therapeutically effective dose. In embodiments (e.g., (1) to (24) above) of the present invention, the "pharmaceutical composition" may be produced by any procedure known in the art of formulation, which procedure includes mixing, for instance, an active ingredient and at least one pharmaceutically acceptable carrier. In addition, a dosage form of the pharmaceutical composition is not limited as long as it can be used for treatment, and may be an active ingredient alone or may be a mixture of an active ingredient and any component(s). Also, the form of the above carrier is not particularly limited, and may be, for instance, a solid or liquid (e.g., a buffer). The content of the above carrier may be, for instance, a pharmaceutically effective amount. The effective amount may be, for instance, an amount sufficient to pharmaceutically stabilize or deliver the active ingredient. For instance, the buffer is effective in stabilization of the active ingredient in a vial. The pharmaceutical composition may also contain a stabilizer (e.g., mannitol), a buffer (e.g., arginine), or a pH modifier (e.g., NaOH). The dose, dosing interval, administration method, and/or administration route are not particularly limited, and may be selected, if appropriate, in view of the age, body weight, symptom, and/or affected organ of a patient. It is also preferable to contain a therapeutically effective amount or effective amount of the active ingredient so as to elicit a desired action. In one embodiment of the invention, the therapeutically effective amount includes the amount necessary for clinically observed improvement of symptoms in a patient. The wording "pharmacologically acceptable" in one embodiment of the present invention includes a condition that fits for use within appropriate medical discretion and that is commensurate with a reasonable benefit/risk ratio. An additional ingredient(s) other than BCV in the pharmaceutical compositions is not particularly limited as long as the effects of the present invention are not impaired, and may be selected, if appropriate, depending on the purpose. The therapeutic effect against AdV infection or disease associated with AdV infection may be judged to have been achieved when the amount of AdV in a patient is significantly reduced after administration of the pharmaceutical composition.

In embodiments (e.g., (1) to (24) above) of the present invention, examples of the subject (including a patient) include a subject diagnosed as having AdV infection or disease associated with AdV infection, a subject suspected of having AdV infection or disease associated with AdV infection, or a subject in need of treatment for AdV infection or disease associated with AdV infection. The subject may be, for example, a subject in whom AdV is detected in a sample, a subject in whom the amount of AdV in a sample is larger than that in a control subject (e.g., a healthy subject), or a subject in whom AdV DNA in a sample is 1,000 copies/ml or more or 10,000 copies/ml or more. The subject may be, for example, a subject who has experienced AdV infection or disease associated with AdV infection. The subject may be, for example, an allogeneic transplant recipient, a autologous transplant recipient, or a hematopoietic stem cell transplant recipient. The subject may be a patient with an immunodeficiency disease or condition, and may include a patient after allogeneic hematopoietic stem cell transplantation. Examples of the subject include a human or a non-human mammal (e.g., at least one species of a mouse, a guinea pig, a hamster, a rat, a mouse, a rabbit, a pig, sheep, a goat, a cow, a horse, a cat, a dog, a marmoset, a monkey, or a chimpanzee). Examples of the subject include a human adult patient or human pediatric patient (e.g., a patient older than 2 months after the birth). The age of the subject may be, for example, 0, 1, 2, 3, 4, 5, 10, 20, 30, 40, 50, 60, 70, 80, 90, or 100, and may be between any two of these values. The subject includes a subject population.

In embodiments (e.g., (1) to (24) above) of the present invention, the subject treated with the BCV, pharmaceutically acceptable salt thereof, or solvate thereof is preferably an allogeneic hematopoietic cell transplantation recipient from the viewpoint of providing more effective treatment against AdV infectious disease. Examples of the effective treatment include reducing the number of patients who do not respond to the treatment, shortening the time until the levels of viral load reaches below the LOD, shortening the duration of treatment, or providing a treatment with superior safety.

In embodiments (e.g., (1) to (24) above) of the present invention, the preferred route of administration of the BCV, pharmaceutically acceptable salt thereof, or solvate thereof (or pharmaceutical composition containing them) to a subject (including a human subject) is intravenous for effective treatment. The preferred dosage form is an injectable form (e.g., intravenous infusion) for effective treatment.

In embodiments (e.g., (1) to (24) above) of the present invention, the salt is not particularly limited and examples include an inorganic or organic salt (see, for example, "Bharate et al., Drug Discov Today. 2021 February; 26(2): 384-398" or "Berge et al., J Pharm Sci. 1977 January; 66(1): 1-19"). Examples of the salt include a metal salt, an ammonium salt, a salt of organic base, a salt of inorganic acid, a salt of organic acid, or a salt of basic or acidic amino acid. Examples of the metal salt include an alkali metal salt (e.g., a sodium salt, a potassium salt), an alkaline earth metal salt (e.g., a calcium salt, a magnesium salt, a barium salt), or an aluminum salt. Examples of the salt of organic base include a salt of trimethylamine, triethylamine, pyridine, picoline, 2,6-lutidine, ethanolamine, diethanolamine, triethanolamine, cyclohexylamine, dicyclohexylamine, or N,N'-dibenzylethylenediamine. Examples of the salt of inorganic acid include a salt of hydrochloric acid, hydrobromic acid, nitric acid, sulfuric acid, or phosphoric acid. Examples of the salt of organic acid include a salt of formic acid, acetic acid, trifluoroacetic acid, phthalic acid, fumaric acid, mesylic acid, tosylic acid, oxalic acid, tartaric acid, maleic acid, citric acid, succinic acid, malic acid, methanesulfonic acid, benzenesulfonic acid, or p-toluenesulfonic acid. Examples of the salt of basic amino acid include a salt of arginine, lysine, or ornithine. Examples of the salt of acidic amino acid include a salt of aspartic acid or glutamic acid. Examples of the salt include a pharmaceutically acceptable salt. In one embodiment of the invention, the wording "pharmaceutically acceptable" includes a form that has reasonable benefit for pharmaceutical use. In one embodiment of the invention, examples of the form of the compound or salt include a form of solvate thereof. In embodiments (e.g., (1) to (24) above) of the present invention, examples of the solvate include a form of compound formed using a solute and a solvent (see, for example, Healy et al., Adv Drug Deliv Rev. 2017 Aug. 1; 117:25-46). Examples of the solvate include, but are not particularly limited to, a hydrate (e.g., a monohydrate, a dihydrate, a trihydrate) or an organic solvate (e.g., a solvate of alcohol (e.g., methanol, ethanol, propanol), acetone, dimethylformamide, or ethyl acetate). Examples of the solvent include a solvent that can be used to substantially maintain the physiological activity of the solute after forming the solvate. Examples of the solvate include a pharmaceutically acceptable solvate.

In embodiments (e.g., (1) to (24) above) of the present invention, the term "significant(ly)" may mean a state of $p<0.05$ or $p<0.01$ after a statistically significant difference is applied in a Student's t-test (one- or two-tailed) for evaluation. Alternatively, the term may refer to a state where a substantial difference occurs.

All the literatures cited herein are incorporated by reference in their entirety. As used herein, the term "or" is used when "at least one" matter listed in the text is acceptable. The same applies to "or". When the wording "number between any two" is indicated herein, this range encompasses the two numbers inclusive. As used herein, "A to B" includes A and B and values contained between A and B. As used herein, the term "having" includes a case of suffering from a disease when the term relates to a disease. As used herein, the "(1) to (24) above" includes references to any one or more of (1), (2), (3), (4), (5), (6), (7), (8), (9), (10), (11), (12), (13), (14), (15), (16), (17), (18), (19), (20), (21), (22), (23) or (24).

Hereinabove, embodiments of the invention have been described. These are examples of forms that can be included in the present invention. The present invention is not limited to these, and various configurations other than the above can be adopted. In addition, in the present invention, the configurations or features described in the above embodiments may be combined and adopted independently.

EXAMPLES

Hereinbelow, the present invention will be described in more detail with reference to Examples. However, the present invention is not limited to them.

Example 1: Human Clinical Study on Treatment of AdV Infectious Disease

A human clinical study on the treatment of adenovirus (AdV) infectious disease was conducted according to the following procedure.
1.1 Materials and Methods
1.1.1 Patients Patients aged 2 months or older who have asymptomatic AdV infection or AdV disease, have an underlying immunocompromised state, and have AdV viremia at a high level, including hematopoietic stem cell transplant recipients before the immune reconstitution by the graft cells is achieved, organ transplant recipients on medication with an immunosuppressant, and patients with immunodeficiency syndrome (patients with 10,000 or more copies/ml in a sample, or patients with 1,000 or more copies/ml in two samples while the second viral load is greater than the first viral load).
1.1.2 Description of Drug The brincidofovir (BCV) infusion is a sterile aqueous solution containing 10 mg/mL BCV.
Summary of Drug
    Product name: Brincidofovir (BCV)
    Dosage form: Solution for infusion
    Unit dose: 10 mg/mL (1 mL per vial)
    Route of administration: Intravenous (IV) infusion Physical description: Clear, colorless solution in a sterile glass vial Storage: Refrigerated (2-8° C.)

Dosing: Continuous IV drip infusion administered over a period of 2 hours twice weekly (on Days 1 and 4)

1.1.3 Dose

Cohort 1:0.2 mg/kg (if body weight≥50 kg, 10 mg/dose), twice weekly

Cohort 2:0.3 mg/kg (if body weight≥50 kg, 15 mg/dose), twice weekly

Cohort 3:0.4 mg/kg (if body weight≥50 kg, 20 mg/dose), twice weekly 1.1.4 Drug Administration The dose of BCV 10 mg/mL solution for infusion is prepared based on the patient's body weight. The following kits are used for IV dose preparation and administration:

IV Bags: Glucose 5%, 100 mL, non-polyvinyl chloride (PVC), diethylhexyl phthalate (DEHP)-free IV Tubing: The Tubing does not contain plasticizer and DEHP-free IV Pumps: An approved tubing is used Preparation: Using a sterile syringe and needle, transfer 1 mL of IV BCV solution from one vial into a 100-mL glucose 5% IV bag to make a diluted dosing solution. For more than 10 mg/dose, prepare one additional diluted dosing solution in the same procedure mentioned above. Gently invert the bag at least 5 times to mix. Note: No vigorous shaking of the solution in a vial or the diluted dosing solution in a bag.

Administer the appropriate volume of diluted dosing solution based on the patient's body weight. Each dose is administered intravenously at a constant rate over 2 hours. Upon completion of the administration, the IV line is flushed with glucose 5% or dextrose 5% to ensure the IV line has been cleared of all active drug. If required per institutional practice, the flush of glucose 5% or dextrose 5% may be followed by a flush with normal saline. Diluted dosing solution should be prepared at the time of use in principle and should not be prepared the day before.

Subjects 101-12 of cohort 2, and 101-15, 101-18 and 110-06 of cohort 3 took cyclosporine, an immunosuppressive drug, during the treatment period (duration of treatment) of intravenous BCV. Prior PK studies in healthy subjects have shown a significant increase in plasma BCV exposure with concomitant intravenous infusion of BCV and cyclosporine. When BCV and cyclosporine were administered simultaneously, the AUCinf and Cmax of BCV in plasma increased approximately 3.4- and 2.3-fold, respectively, compared with those of BCV alone. When cyclosporine was administered at 2 hours after the end of intravenous BCV infusion over 2 hours, the AUCinf and Cmax of BCV in plasma increased approximately 1.8- and 1.3-fold, respectively, compared with those of BCV alone. In addition, the AUCinf and Cmax of BCV in plasma were substantially the same between cohort 3 patients and healthy controls when BCV was administered alone. In view of the above, for the above patients taking cyclosporine, any of the doses indicated in 1.1.3 (cohorts 1-3) above is reduced to 60% for administration. Note that when cyclosporine is administered as BID (twice daily) oral or injectable form, the administration is conducted with an interval of 2 hours after the completion of intravenous BCV. In the case of continuous infusion of cyclosporine for 24 hours, no interval is needed.

1.1.5 Duration of Study

The study duration is at least 9 weeks, based on a screening period of 1 week, a treatment period of at least 4 weeks, and post-treatment follow-up period of 30 days. In the screening, after informed consent has been obtained from the patients, a screening evaluation is conducted to determine eligibility for the study. On the first day of the first week of the treatment period, patients are assigned a dose based on the applicable cohort (see the section 1.1.3 Cohorts 1-3 above). The duration of treatment is a minimum of 4 weeks and a maximum of 14 weeks, and termination is based on the treatment stopping criteria as described below. For patients who, at the physician's discretion, are assessed as being at high risk for AdV infection/recurrence of disease, the treatment period may be extended for up to 10 weeks, even after the 4-week treatment period is completed, if the AdV is not detected by the two most recent consecutive assays with an interval of 3 days at least. All patients are followed up for 30 days after the last dosing. Adverse events is evaluated according to the National Cancer Institute Common Terminology Criteria for Adverse Events (NCI CTCAE) version 5.0 (grade 1-5). Based on the results of the review of safety data from cohort 1, a decision is made whether to initiate cohort 2. Likewise, the decision to initiate cohort 3 is based on the results of the review of safety data from cohort 2. Enrollment in a new cohort is terminated immediately if grade 3 or higher adverse events are observed in more than 25% of all subjects in the previous cohort.

The treatment stopping criteria are used to describe when the treatment period is ended as follows. Adenovirus in the sample of interest is measured multiple times. The treatment stopping criteria are fulfillment of both of the following conditions: the case where the levels of viral loads of AdV are below the LOD in the two most recent consecutive assays and the case where the 4-week treatment has been completed. To confirm the levels of viral load of AdV lower than the LOD, 2 consecutive plasma viral load test results lower than the LOD are required. After the first result is reported as lower than the LOD, a confirmatory blood sample must be drawn no sooner than the 3rd day (2 full calendar days in between) and no later than the 14th day (13 full calendar days in between) after the first sample was collected. Patients receiving IV BCV treatment are continue their 4-weeks treatment even when the levels of viral load of AdV are confirmed as lower than the LOD, unless precluded by the guidelines for managing BCV specific adverse events. If 2 consecutive results of viral load of AdV in plasma lower than the LOD are confirmed before completion of BCV treatment for 4 weeks, the patients are continue their assigned BCV treatment for 4 weeks. If AdV viremia remains present and is confirmed by continuous weekly viral load test until Week 5 Day 1, BCV treatment may continue until a maximum of 14 weeks. Patients who have received the IV BCV treatment for 4 weeks discontinue the treatment when the levels of viral load of AdV in plasma are confirmed as lower than the LOD by 2 consecutive test results, followed by a post-treatment follow-up.

1.1.6 Blood Samples for Viremia Analysis

Blood of each patient was drawn and collected in dipotassium dihydrogen ethylenediaminetetraacetate (K2EDTA) tube, inverted 8-10 times, then centrifuged at 1100-1300×g for 10 minutes to separate plasma immediately after or within 30 minutes of collection. The plasma was frozen and stored at −70° C. for analysis of AdV viremia using a real-time qPCR test method (LOD: 25 copies/ml; lower limit of quantification: 190 copies/ml; upper limit of quantification: $1 \times 10^{10}$ copies/mL).

1.2 Clinical Study Data

Figure 2:
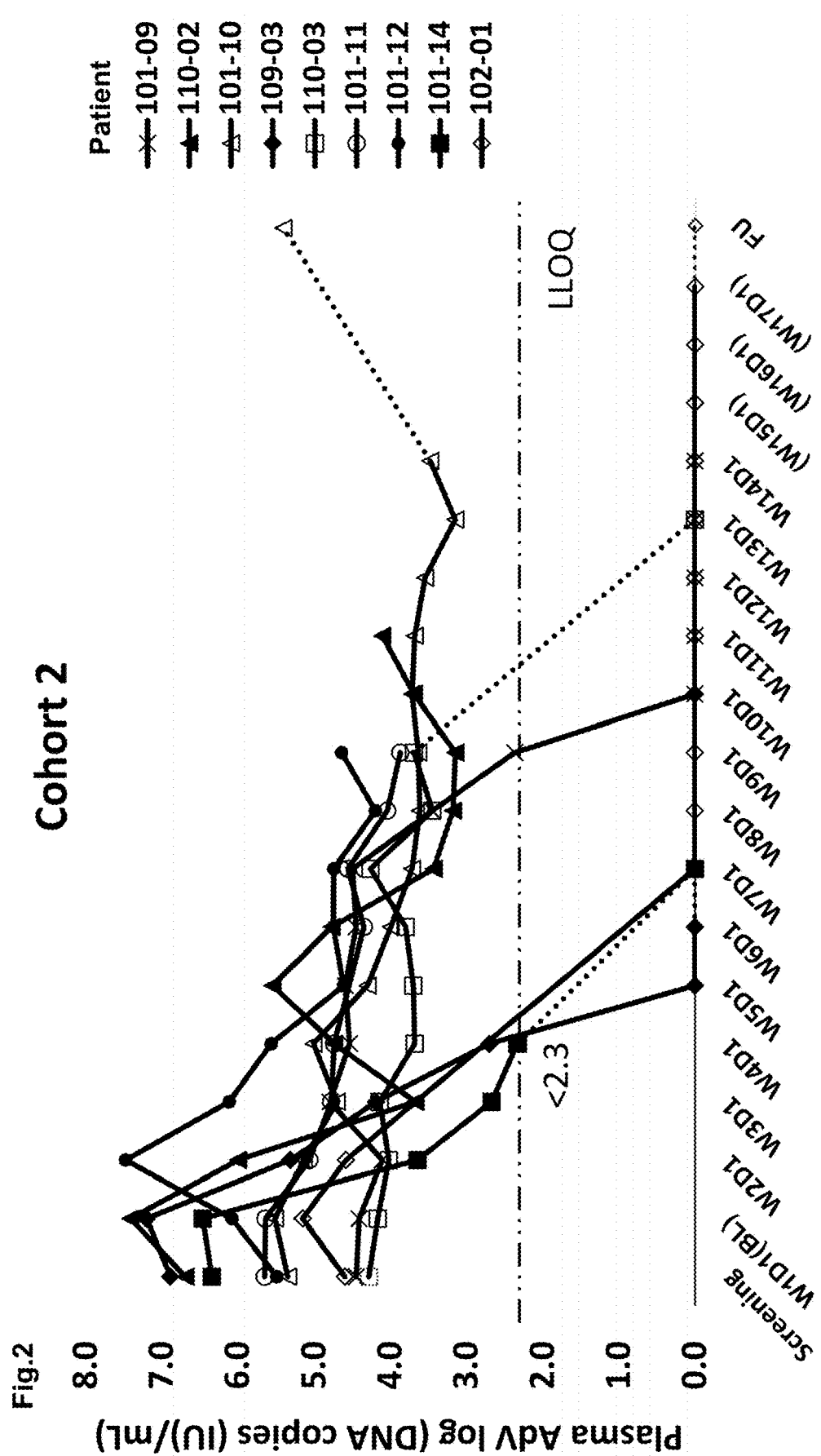
FIG. 2 shows viral load of AdV in patients in cohort 2.
Figure 3:
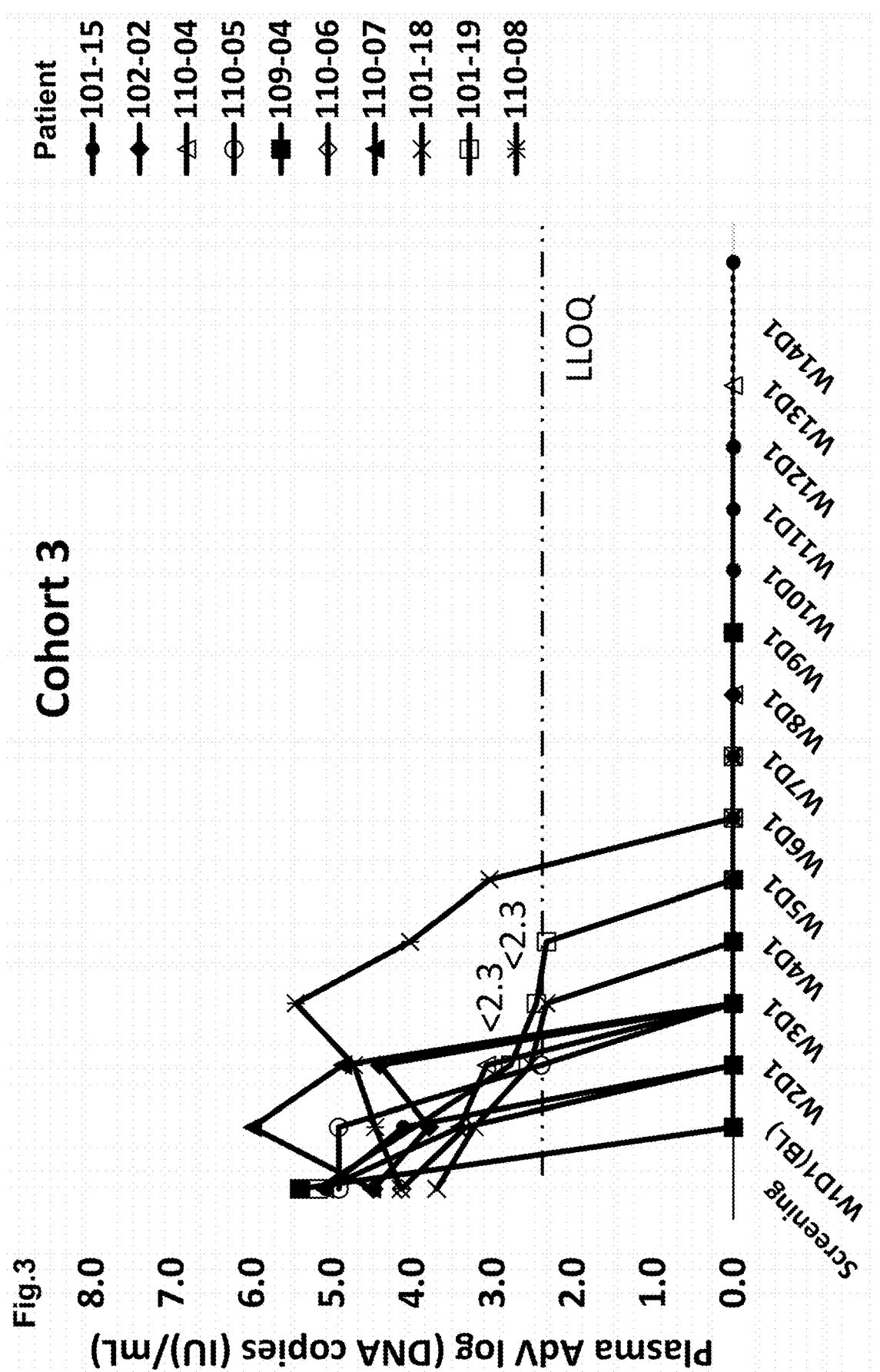
FIG. 3 shows viral load of AdV in patients in cohort 3.

FIGS. 1-3 show the test results for cohorts 1-3. In the horizontal axis of FIGS. 1-3, W of W1D1 means week and D means day (i.e., W1D1 is the first day of the first week).

The same applies to W2D1 and others. The vertical axis in FIGS. 1-3 shows the viral load of AdV in plasma. The LLOQ line is lower limit of quantification. Cohorts 1-3 include male or female patients aged 0-80 years and with a body weight of 5.4-82.4 kg. One patient in cohort 1 and two each in cohorts 2 and 3 are patients with a body weight of 50 kg or more.

In cohort 1, the levels of viral load of AdV reached below the LOD in two patients. One of the two cases had a relapse. In addition, one patient died. In cohort 2, the levels of viral load of AdV reached below the LOD in 5 patients. Overall, it took a longer time for the levels of viral load to reach below the LOD in those 5 cases. In addition, one patient died.

In cohort 3, the levels of viral load of AdV reached below the LOD in all cases (10 cases). No patient relapsed or died. Further, it took a shorter time for the levels of viral load to reach below the LOD overall in those 10 cases. In cohort 3, the levels of viral loads in 8 patients reached below the LOD within 4 weeks, and in the remaining 2 patients at Week 5 and 6. These results indicate that cohort 3 can reduce the incidence of patients who do not respond to treatment. In addition, in cohort 3, the time to reach the viral load levels below the LOD was shorter, indicating that the duration of treatment could be shortened. Furthermore, in cohort 3, it was shown that the duration of treatment could be shortened, especially since the dosing period could be terminated based on the above-mentioned treatment stopping criteria.

BCV-related adverse events were as follows. Cohort 1:110-01: diarrhea—grade 2 (possibly); 109-01: elevated aspartate transaminase (AST)—grade 1 (probably), elevated alanine transaminase (ALT)—grade 1 (probably), elevated lactate dehydrogenase (LDH)—grade 1 (possibly). Cohort 2: 101-09: diarrhea—grade 3 (possibly); 109-03: nausea—grade 1 (possibly); 101-14: hypertransaminasemia—grade 3 (possibly). Cohort 3: 102-02: increased ALT—grade 3 (possibly), increased AST—grade 3 (possibly); 109-04: feeling of a racing heart—grade 1 (possibly), nausea—grade 1 (possibly). Grade 3 adverse events were 0 in cohort 1, 2 in cohort 2, and 1 in cohort 3. Cohort 3 had a higher dose than cohort 2, but had a lower incidence of grade 3 adverse events.

1.3. Discussion

BCV infusion is effective in the treatment of AdV infectious disease and prevention of AdV infectious disease in immunocompromised patients. Intravenous administration of 0.4 mg/kg (20 mg when the body weight≥50 kg) twice weekly showed markedly superior therapeutic effects. This administration method can reduce the incidence of patients who do not respond to treatment. This administration method shortens the treatment period because it takes a short period of time until the viral load of AdV reaches the levels below the LOD and also suppresses recurrence. This administration method can especially shorten the duration of treatment by applying the above treatment stopping criteria. In addition, the shortened duration of treatment provides benefits such as suppressing the emergence of resistant strains, reducing the patient's physical burden, reducing the incidence of adverse events, and reducing the cost of treatment. This administration method is excellent in safety with a low incidence of adverse events.

Example 2: Analysis of AdV Content in Stool

In the clinical study of Example 1, the AdV contents in the stools of patients were examined. As shown in FIG. 4, stool samples were collected from the patients and examined. In the figure, D means detected, ND means not detected, and NP means not performed. A quantitative PCR method was used to analyze AdV contents.

In cohort 1, AdV content was reduced to ND in none of 8 patients during the study period. In cohort 2, AdV content was reduced to ND in 2 of 9 patients during the study period. In one of the two cases, AdV was detected in the following week.

In cohort 3, AdV content was reduced to ND in 5 of 8 patients during the study period. There has been no available drug that can eliminate AdV in stools. Here, the administration method of cohort 3 has been found to effectively eliminate AdV in stools.

Example 3: Analysis of Lymphocytes

Figure 5:
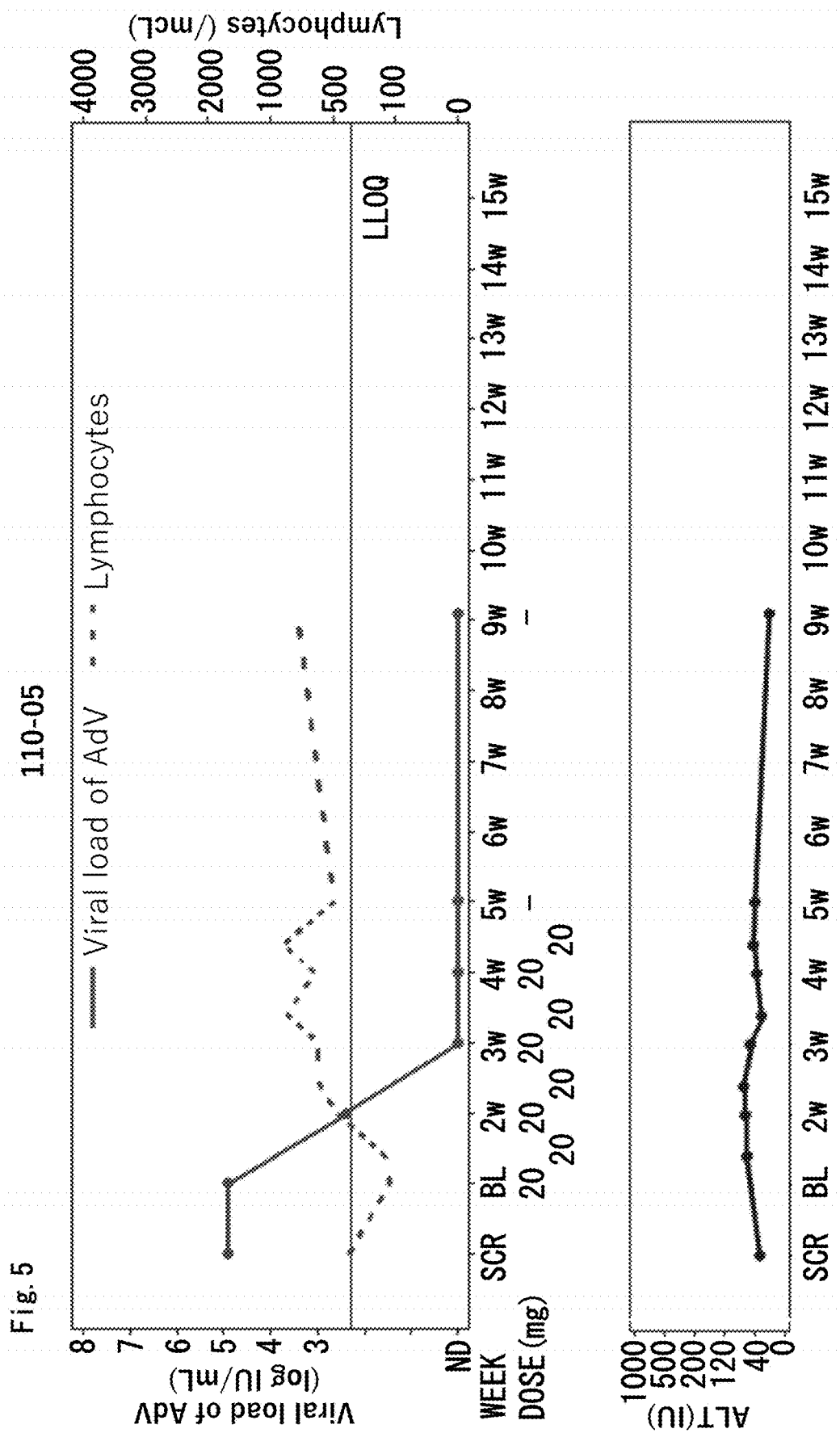
FIG. 5 shows the results of the absolute lymphocyte count in a patient in cohort 3.

In the clinical study of Example 1, the absolute lymphocyte count in the plasma of the patient 110-05 in cohort 3 was examined. FIG. 5 shows the results of absolute lymphocyte count, viral load of AdV, and ALT level. The viral load of AdV was reduced to a level below the LOD at Week 3, while the number of lymphocytes tended to increase. The trend of increase in the number of lymphocytes has suggested that the immune system related to lymphocytes was restored and that recurrence of AdV viremia was unlikely to occur.

Example 4: Human Clinical Study on Treatment of AdV Infectious Disease

A human clinical study on the treatment of AdV infectious disease is conducted according to the following procedure.
4.1 Materials and Methods
4.1.1 Patients Patients aged 2 months or older who have asymptomatic AdV infection or AdV disease and have an underlying immunocompromised state, including hematopoietic stem cell transplant recipients before the immune reconstitution by the graft cells is achieved, organ transplant recipients on medication with an immunosuppressant, and patients with immunodeficiency syndrome.
4.1.2 Description of Drug The BCV infusion is a sterile aqueous solution containing 10 mg/mL BCV.
Summary of Drug
  Product name: Brincidofovir (BCV)
  Dosage form: Solution for infusion
  Unit dose: 10 mg/mL (1 mL per vial)
  Route of administration: Intravenous (IV) infusion
  Physical description: Clear, colorless solution in a sterile glass vial
  Storage: Refrigerated (2-8° C.)
  Dosing: Continuous IV drip infusion administered over a period of 2 hours once weekly
4.1.3 Dose
  Cohort 4:0.4 mg/kg (if body weight≥50 kg, 20 mg/dose), once weekly
  Cohort 5:0.6 mg/kg (if body weight≥50 kg, 30 mg/dose), once weekly
  Cohort 6:0.8 mg/kg (if body weight≥50 kg, 40 mg/dose), once weekly
4.1.4 Drug Administration The dose of BCV 10 mg/mL solution for infusion is prepared based on the patient's body weight. The following kits are used for IV dose preparation and administration:
  IV Bags: Glucose 5%, 100 mL, non-polyvinyl chloride (PVC), diethylhexyl phthalate (DEHP)-free IV Tubing: The Tubing does not contain plasticizer and DEHP-free IV Pumps: An approved tubing is used Preparation: Using a sterile syringe and needle, transfer 1 mL of IV BCV solution from one vial into a 100-mL glucose 5% IV bag to make a diluted dosing solution. For more than 10 mg/dose, prepare one additional diluted dosing solution in the same procedure mentioned above. Gently invert the bag at least 5 times to mix. Note: No vigorous shaking of the solution in a vial or the diluted dosing solution in a bag.

Administer the appropriate volume of diluted dosing solution based on the patient's body weight Each dose is administered intravenously at a constant rate over 2 hours. Upon completion of the administration, the IV line is flushed with glucose 5% or dextrose 5% to ensure the IV line has been cleared of all active drug. If required per institutional practice, the flush of glucose 5% or dextrose 5% may be followed by a flush with normal saline. Diluted dosing solution should be prepared at the time of use in principle and should not be prepared the day before.

Prior PK studies in healthy subjects have shown a significant increase in plasma BCV exposure with concomitant intravenous infusion of BCV and cyclosporine. When BCV and cyclosporine were administered simultaneously, the AUCinf and Cmax of BCV in plasma increased approximately 3.4- and 2.3-fold, respectively, compared with those of BCV alone. When cyclosporine was administered at 2 hours after the end of intravenous BCV infusion over 2 hours, the AUCinf and Cmax of BCV in plasma increased approximately 1.8- and 1.3-fold, respectively, compared with those of BCV alone. In addition, the AUCinf and Cmax of BCV in plasma were substantially the same between cohort 3 patients and healthy controls when BCV was administered alone. In view of the above, for the above patients taking cyclosporine, any of the doses indicated in 4.1.3 (cohorts 4-6) above is reduced to 60% for administration. Note that when cyclosporine is administered as BID (twice daily) oral or injectable form, the administration is conducted with an interval of 2 hours after the completion of intravenous BCV. In the case of continuous infusion of cyclosporine for 24 hours, no interval is needed.

4.1.5 Duration of Study

The study duration is at least 9 weeks, based on a screening period of 1 week, a treatment period of at least 4 weeks, and post-treatment follow-up period of 30 days. In the screening, after informed consent has been obtained from the patients, a screening evaluation is conducted to determine eligibility for the study. On the first day of the first week of the treatment period, patients are assigned a dose based on the applicable cohort (see the section 4.1.3 Cohorts 4-6 above). The duration of treatment is a minimum of 4 weeks and a maximum of 14 weeks, and termination is based on the treatment stopping criteria as described below. For patients who, at the physician's discretion, are assessed as being at high risk for AdV infection/recurrence of disease, the treatment period may be extended for up to 10 weeks, even after the 4-week treatment period is completed, if the AdV is not detected by the two most recent consecutive assays with an interval of 3 days at least. All patients are followed up for 30 days after the last dosing. Adverse events are evaluated according to the National Cancer Institute Common Terminology Criteria for Adverse Events (NCI CTCAE) version 5.0 (grade 1-5). In cohort 4, patients are enrolled in the initially planned dosing regimen of 0.4 mg/kg or 20 mg IV weekly. If tolerability is confirmed in the 3 patients in cohort 4, cohort 5 is initiated and the dose of BCV is increased to 0.6 mg/kg or 30 mg IV weekly. If the dose-limiting toxicity (DLT) observed in the 3 patients in cohort 5 is found in one case or less, cohort 6 is initiated and the dose of BCV is increased to 0.8 mg/kg or 40 mg IV weekly (n=6).

The following describes when to end the treatment period based on the treatment stopping criteria. Adenovirus in the sample of interest is measured multiple times. The treatment stopping criteria are fulfillment of both of the following conditions: the case where the levels of AdV viral load are below the LOD in the two most recent consecutive assays and the case where four weeks are elapsed from the initiation of administration. To confirm the levels of viral load of AdV lower than the LOD, 2 consecutive plasma viral load test results lower than the LOD are required. After the first result is reported as lower than the LOD, a confirmatory blood sample must be drawn no sooner than the 3rd day (2 full calendar days in between) and no later than the 14th day (13 full calendar days in between) after the first sample was collected. Patients receiving IV BCV treatment are continue their 4-weeks treatment even when the levels of viral load of AdV are confirmed as lower than the LOD, unless precluded by the guidelines for managing BCV specific adverse events. If 2 consecutive results of viral load of AdV in plasma lower than the LOD are confirmed before completion of BCV treatment for 4 weeks, the patients are continue their assigned BCV treatment for 4 weeks. If AdV viremia remains present and confirmed by continuous weekly viral load testing until Week 5 Day 1, BCV treatment may continue until a maximum of 14 weeks. Patients who have received the IVBCV treatment for 4 weeks discontinue the treatment when the levels of viral load of AdV in plasma are confirmed as lower than the LOD by 2 consecutive test results, after the post-treatment follow-up visit.

4.1.6 Blood Samples for Viremia Analysis

Blood of each patient is drawn and collected in K2EDTA tube, inverted 8-10 times, then centrifuged at 1100-1300×g for 10 minutes to separate plasma immediately after or within 30 minutes of collection. The plasma is frozen and stored at −70° C. and analyzed for AdV viremia by real-time qPCR method.

4.2 Clinical Study Data

In patients in cohorts 4-6, the levels of viral load of AdV reaches below the LOD during the study period. The occurrence of adverse events is particularly suppressed in cohort 4.

Hereinabove, the present invention has been described based on the Examples. The Examples are just examples. It should be understood by those skilled in the art that various modifications are allowed and such modified embodiments are within the scope of the present invention.

The invention claimed is:

1. A method of treating adenovirus infection or disease associated with adenovirus infection in a human subject in need thereof, the method comprising (i) intravenously administering, to the human subject, brincidofovir, a pharmaceutically acceptable salt thereof, or a solvate thereof at 0.38 to 0.42 mg/kg twice weekly, or (ii) intravenously administering, to the human subject, brincidofovir, a pharmaceutically acceptable salt thereof, or a solvate thereof at 18 to 22 mg/dose twice weekly, and the subject in (i) has a body weight of less than a specific body weight and the subject in (ii) has a body weight of the specific body weight or more, and the specific body weights in (i) and (ii) are identical and are from 48 to 52 kg.

2. The method according to claim 1, wherein the 0.38 to 0.42 mg/kg is 0.4 mg/kg and the 18 to 22 mg/dose is 20 mg/dose.

3. The method according to claim 2, wherein the subject in (i) has a body weight of less than a specific body weight and the subject in (ii) has a body weight of the specific body weight or more, and the specific body weights in (i) and (ii) are identical and are 50 kg.

4. The method according to claim 1, wherein the brincidofovir, pharmaceutically acceptable salt thereof, or solvate thereof is brincidofovir.

5. The method according to claim 1, wherein the method treats adenovirus infection or adenovirus infectious disease.

6. The method according to claim 1, wherein in the treatment, dosing the brincidofovir, pharmaceutically acceptable salt thereof, or solvate thereof is terminated based on treatment stopping criteria.

7. The method according to claim 6, wherein the treatment stopping criteria include that a four-week treatment has been completed.

8. The method according to claim 1, wherein in the treatment, a period of dosing the brincidofovir, pharmaceutically acceptable salt thereof, or solvate thereof is terminated based on fulfillment of both conditions: (a) a case where viral load of adenovirus in a blood sample of the subject is measured multiple times, and the levels of viral load of adenovirus are below the detection limit in two consecutive assays and (b) a case where a four-week treatment has been completed.

9. The method according to claim 3, wherein in the treatment, a period of dosing the brincidofovir, pharmaceutically acceptable salt thereof, or solvate thereof is terminated based on fulfillment of both conditions: (a) a case where viral load of adenovirus in a sample of the subject is measured multiple times, and the levels of viral load of adenovirus are below the detection limit in two consecutive assays and (b) a case where a four-week of treatment has been completed.

10. The method according to claim 8, wherein the multiple measurements in the condition (a) are performed with an interval of 3 days or more and 14 days or less.

11. The method according to claim 10, wherein in the condition (a), viral load of adenovirus in the blood sample of the subject is measured multiple times and the levels of viral load of adenovirus is below the detection limit in two most recent consecutive assays.

12. The method according to claim 1, wherein when the treatment is performed under a condition where cyclosporine is used in combination with the brincidofovir, pharmaceutically acceptable salt thereof, or solvate thereof for administration, a dose of the brincidofovir, pharmaceutically acceptable salt thereof, or solvate thereof in (i) and (ii) is reduced to 55 to 65%.

13. The method according to claim 12, wherein the 55 to 65% is 60%.

14. The method according to claim 1, wherein in the treatment, the brincidofovir, pharmaceutically acceptable salt thereof, or solvate thereof is administered by intravenous drip infusion over 1.5 to 4 hours.

15. The method according to claim 14, wherein the 1.5 to 4 hours is 2 hours.

* * * * *